May 20, 1930.  O. F. ROHWEDDER  1,759,592
RETAINER FOR SLICED BREAD
Filed Jan. 25, 1927

INVENTOR.
BY
ATTORNEY.

Patented May 20, 1930

1,759,592

UNITED STATES PATENT OFFICE

OTTO F. ROHWEDDER, OF DAVENPORT, IOWA, ASSIGNOR TO MAC-ROH SALES & MFG. COMPANY, OF DAVENPORT, IOWA, A CORPORATION OF DELAWARE

RETAINER FOR SLICED BREAD

Application filed January 25, 1927. Serial No. 163,441.

My invention relates to a means for holding the slices of a sliced loaf of bread together substantially in their original presliced position.

The objects of my invention are:
1. To provide means for holding the slices of a cut loaf of bread together as a whole;
2. To hold the slices at each end of the loaf and permit slices to be taken from the middle of the loaf and allow the remaining portions of the loaf to be placed in juxtaposition;
3. To provide means to retain the end crusts of a loaf of bread in their original position, thus avoiding the exposure of a cut surface to the air;
4. To provide as an article of merchandise, a sliced loaf of bread with the slices secured in their original position by means which will allow ready access to any part of the loaf.

I attain these objects by the means illustrated in the accompanying drawings, in which,—

Figure 1:
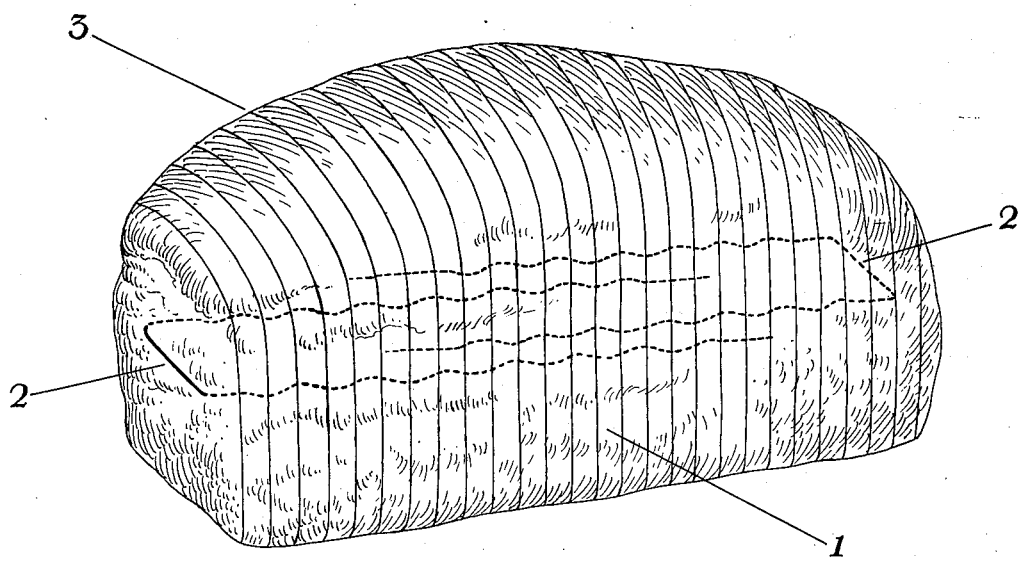
Figure 2:
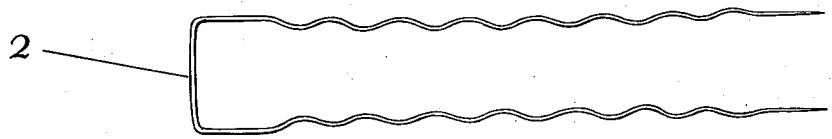

Figure 1 is a perspective view of a sliced loaf of bread and showing the fasteners or retainers in dotted lines; Figure 2 is a plan view of one of the retainers.

In the operation of my process, the bread is sliced preferably by a slicing machine, which slices the whole loaf at once, and is held in its original position by guides or other suitable means during the slicing operation and after the slicing is completed. While so held, staples of wire or other suitable material having a length substantially exceeding one-half of the length of the loaf of bread are inserted in each end of the loaf and pressed inwardly until the heads of the staples come in contact with the end crusts and the inner portions of the staples overlap at the middle of the loaf.

It is obvious that with this construction the loaf can easily be separated at or near the middle and any desired number of slices taken out without removing the staples from the end of the bread and the remaining slices of the bread can then be reassembled with the cut faces in juxtaposition and the staples overlapping as much as may be necessary, the pointed ends of the staples extending out through the end crusts if necessary or when it is desired to avoid having the pointed ends of the staples projecting through the ends of the loaf, the staples may be withdrawn sufficiently to allow for the shortening of the loaf. It is also obvious that one of the staples may be removed so that a few of the slices at the corresponding end of the loaf may be taken out, and that the other staple hold the remaining slices in position so that they will not separate from each other and dry out.

These staples are preferably made of light wire which can easily be bent so that the projecting ends or the projecting heads of the staples, as the case may be, may be bent down in close contact with the loaf and avoid danger of injury from the projecting points. The staples are preferably made with longitudinal undulations which may be either horizontal as shown in Figure 2 or vertical as shown in Figure 1.

I claim:
1. A sliced loaf of bread in combination with centrally overlapping retainers secured therein longitudinally from opposite ends and securing the slices of the loaf in their original position.
2. A sliced loaf of bread in combination with overlapping indented wire staples inserted longitudinally in the loaf from the opposite ends thereof and securing the slices of the loaf in their original position.
3. A sliced loaf of bread having the slices thereof secured in their original position by staples inserted in the loaf from opposite ends thereof with their inner ends substantially overlapping near the middle of the loaf.
4. A sliced loaf of bread having the slices thereof secured in their original position by staples inserted in the loaf from the opposite ends thereof approximately upon the longitudinal axis of the loaf and having their inner end portions substantially overlapping within the loaf.

In testimony whereof he affixes his signature.

OTTO F. ROHWEDDER.